United States Patent [19]

Bogle et al.

[11] Patent Number: 4,534,629
[45] Date of Patent: Aug. 13, 1985

[54] MOTION PICTURE CAMERA AUTOMATIC FOCUSING SYSTEM

[76] Inventors: Robert W. Bogle, 991 Skylark Dr., La Jolla, Calif. 92037; Gary Gero, 25191 Rivendell Dr., El Toro, Calif. 92630

[21] Appl. No.: 510,686

[22] Filed: Jul. 5, 1983

[51] Int. Cl.³ .............................................. G03B 3/00
[52] U.S. Cl. ..................................... 352/140; 354/400
[58] Field of Search ............... 352/139, 140; 354/400, 354/401

[56] References Cited

U.S. PATENT DOCUMENTS

| | | | |
|---|---|---|---|
| 4,103,309 | 7/1978 | Massa | 354/24 |
| 4,239,356 | 12/1980 | Freudenschuss et al. | 354/23 R |
| 4,268,137 | 5/1981 | Cocron et al. | 354/23 D |
| 4,274,735 | 6/1981 | Tamura et al. | 356/1 |
| 4,291,965 | 9/1981 | Johnson et al. | 354/195 |
| 4,294,531 | 10/1981 | Shenk | 354/195 |

*Primary Examiner*—Monroe H. Hayes
*Attorney, Agent, or Firm*—Baker, Maxham, Callan & Jester

[57] ABSTRACT

A focusing system for a variable focus lens of a motion picture camera includes a pulse modulator and a microwave transmitter mounted on a camera frame for generating a high frequency pulsed signal which is transmitted to a selected target which carries a reactive signal generator that is responsive to the first signal for coding and retransmitting the coded signal back to a receiver mounted on the camera frame, and a signal processor for determining the interval of travel of the signal and translating the interval into a distance-analog signal that is transmitted to a focusing motor for driving the focusing mechanism of the lens for focusing the lens at the distance determined by the signal. One alternate embodiment includes multiple reactive signal generators having distinctive signal responsive controls and portable remote transmitters for selectively switching to the selected ones of said reactive generators. Another embodiment includes a system for synchronizing the controls of multiple cameras for preventing interference between them.

20 Claims, 5 Drawing Figures

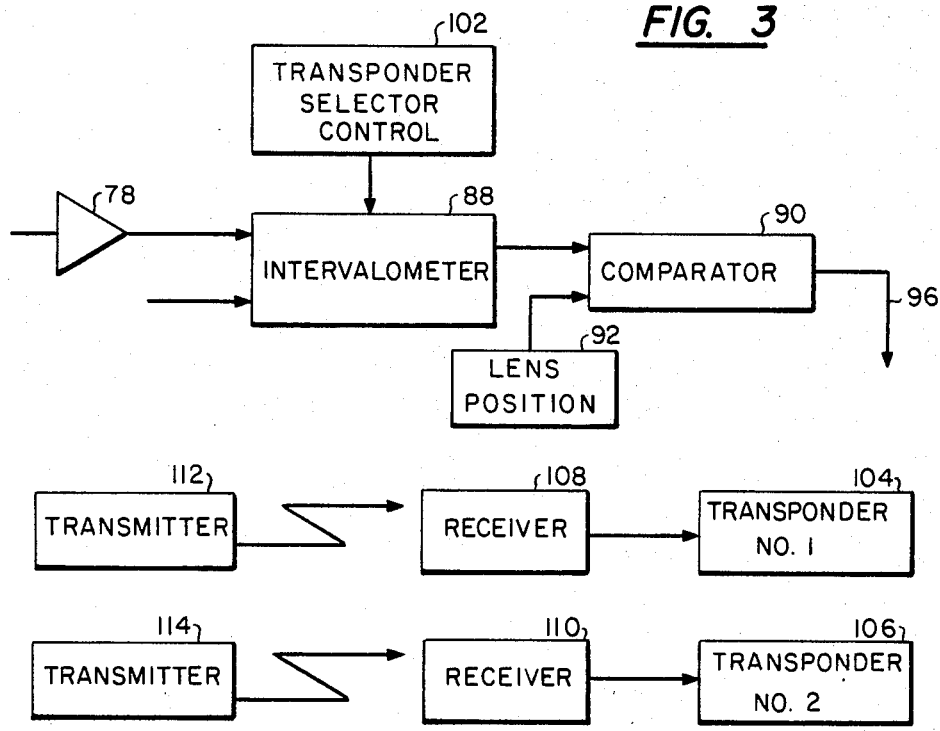
FIG. 3
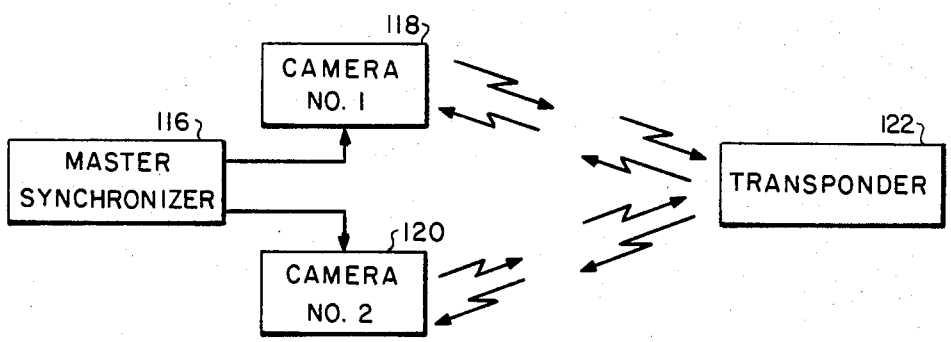
FIG. 4
FIG. 5

MOTION PICTURE CAMERA AUTOMATIC FOCUSING SYSTEM

BACKGROUND OF THE INVENTION

The present invention relates to an automatic focusing system for cameras and particularly to a system for a movie camera and to a camera incorporating said system.

The critical importance of proper focusing of a camera will be more fully appreciated in its application to the commercial production of motion pictures. Sharpness of focus is an important consideration in the production of realistic, commercially valuable films. Maintenance of a sharply focused image of the principal object of interest in a given scene, particularly when the principal object is in movement toward or from the camera, is a matter of particular challenge in cinematography. In this regard, the concept of depth of field is pertinent. Depth of field is a description of the range of distances an object of interest can be from the camera and remain in acceptably sharp focus without adjustment of the camera lens. Depth of field becomes smaller with increasing lens focal length, with larger lens aperture and with decreasing object distance to the camera. In commercial camera work, whether with film or video cameras, a tendency toward long focal length lenses operated with large aperture puts narrow limits on depth of field in usual practice and, accordingly, on the demands for precise adjustment of lens focus. Under these conditions it is essential that the lens be focused accurately. In the past, this has depended upon the skill of the camera operator.

In an effort to overcome these problems, various automatic focusing systems for movie and still cameras have been proposed in the past. These prior art proposals have included ultrasonic ranging systems which have an ultrasonic pulse and a receiver for receiving a reflected pulse from the target and producing a signal indicative of the range and utilizing the signal for varying the focus of the lens. Such systems operate satisfactorily under certain situations, such as a single moving target, but present problems wherein multiple targets or multiple moving targets or objects surround the principle target.

For example, many scenes for motion pictures involve "action" scenes involving several moving objects in addition to the principle target that may tend to confuse the camera focusing process.

Other systems have utilized light beams such as infra-red light beams and the like for the generated signal. These systems suffer from the same problem as the ultrasonic systems in that target discrimination becomes a problem wherein multiple moving targets are within the scene of the principle target. One system employed is that of a light system which employs two small mirrors on either side of a prism. The prism reflects light rays to two identical photocells which are connected to a complex electronic comparator circuit. The scene before the camera is viewed by the mirrors, one of which is fixed at a preset angle to the prism and the other which vibrates to scan the scene. A small microprocessor measures the angle of the scanning mirror when the images coincide to calculate the camera-to-subject distance and sends a signal to a focusing motor which adjusts the lens accordingly.

Such autofocusing systems, however, are not foolproof in that they will always focus upon the nearest dominant object to the camera which may not always be the subject which the operator wishes to focus upon. For this reason, such autofocusing cameras are typically provided with a manual override so that the camera operator can deal with this situation. This again, however, must rely upon the skill of the cameraman to maintain the scene in focus.

Movie production becomes enormously expensive because of the necessity of retakes for various reasons, including the problem of incorrect focusing. This addes to the already tremendous costs of retakes and the like frequently required during movie production.

It is therefore desirable that a system be available which is selectively and highly discriminating as to targets for a movie camera focusing.

The present system employs means for more particularly discriminating selected objects or targets within a scene to be photographed.

SUMMARY AND OBJECTS OF THE INVENTION

It is therefore the primary object of the present invention to provide an improved movie camera focusing system.

In accordance with the primary aspect of the present invention, an automatic focusing system for a movie camera includes a pulse signal generator co-located on the camera with a target transponder located on the target that receives and codes the pulse signal with a receiver on the camera that receives the coded signal and determines the focal distance generating a signal in response thereto that controls a focusing motor for focusing the lens of the camera.

BRIEF DESCRIPTION OF THE DRAWINGS

The above and other objects and advantages of the present invention will become apparent from the following description when read in conjunction with the accompanying drawings wherein:

FIGS. 3, 4, and 5 are schematic illustrations of alternate embodiments of the circuit of the present system.

DETAILED DESCRIPTION OF PREFERRED EMBODIMENTS

Figure 1:
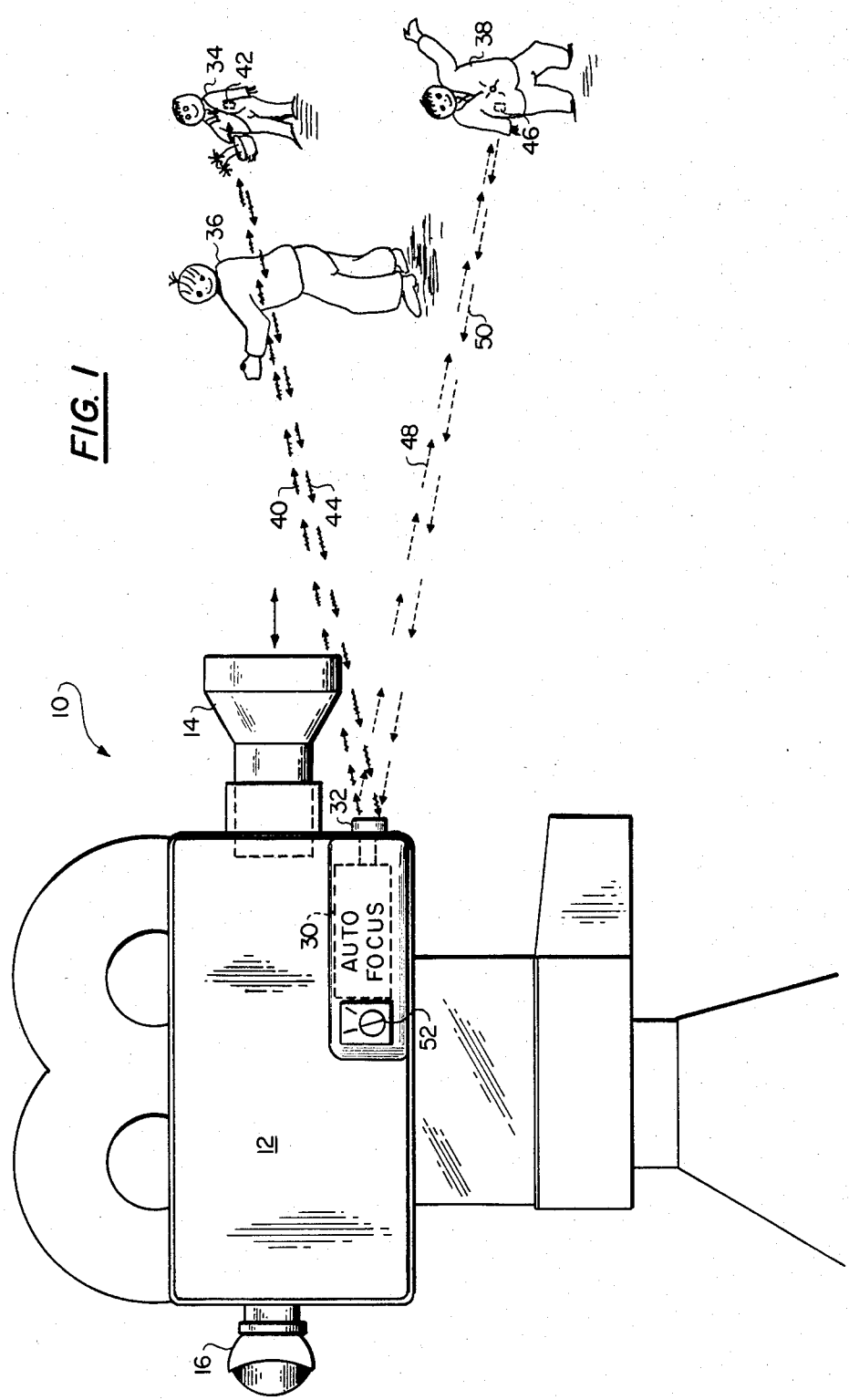
FIG. 1 is a schematic illustration of a camera automatic focusing system in accordance with the invention in use.

Turning to FIG. 1 of the drawings, a camera equipped with a focusing system in accordance with the invention designated generally by the numeral 10 comprises a housing 12 having a focusing lens system 14 mounted on the forward or front end thereof or antennae on camera system separate and a view finder 16 on the side of the housing for framing the subject. Schematically illustrated is an automatic focusing system 30 preferably mounted within the housing 12 and including a sending and receiving antenna 32 for establishing the range or distance to the selected object or target and controlling the focus of the lens 14 in accordance therewith.

For the purpose of better illustrating the operation of the camera and its automatic focusing system, the camera is illustrated as filming a scene having a plurality of moving figures including a primary subject 34 with a more dominant subject 36 dominating in both position and size and a secondary selectable subject 38. For the purposes of illustration it is assumed that the figures are in motion with the primary subject 34 being the primary focus of attention. For this reason, the primary focus of the camera will be predominantly on this figure which in the illustrated scene is overshadowed by a secondary figure 36. A secondary center of focus will be the figure 38 which the camera can quickly swing to or select by use of the system as the scene calls for it.

In accordance with the primary aspect of the system, the autofocusing system 30 generates and transmits a radio signal 40 consisting of a sequence of high frequency short time duration pulses which are transmitted in a direction toward the scene to be shot from the antenna 32. The signals 40 will be received by or sensed by a miniature coding unit 42 mounted on or carried in the clothing of the principle subject 34 which in response to the transmitted signal, codes and returns a signal 44 which is distinctive from the transmitted signal. The coding unit 42 functions like a transponder in a radar system. The received coded signal is received by the antenna 32 and processed in the microprocessor of the autofocus system which essentially establishes the time interval between the transmitted signal and the received signal and translates that into a signal which represents the distance between the lens and the subject. This signal is then utilized for signalling the autofocusing system to adjust the lens 14 to the proper focus. The system acts somewhat in the manner of a ranging radar with the application and, the system being necessarily a special adaptation and application due to the short range of necessary operation being on the order of between from about 3 meters to roughly 100 meters.

A secondary target 38 on which the camera may be selectively focused at one or more intervals, also carries a coding device 46 which receives a signal 48 which is coded and returned as a signal 50. The signal 48 may be the same or different from the signal 40 as will be explained. The autofocusing system of the camera will be provided with a selector control 52 which the operator may manipulate for selection of one or the other subject 34 and 38. Preferably, the camera focusing control system incorporates suitable speed control of the focusing of the lens so that an appropriate rate of fading in and out from one to another target is established. An appropriate time rate of focusing may be built into the system as desired.

The present system can be incorporated in either film or video cameras inasmuch as both utilize similar lens systems with similar requirements for focusing. It is understood that the illustrated camera 12 includes the usual shutter control, light control and other necessary controls which will not be specifically described herein.

Figure 2:
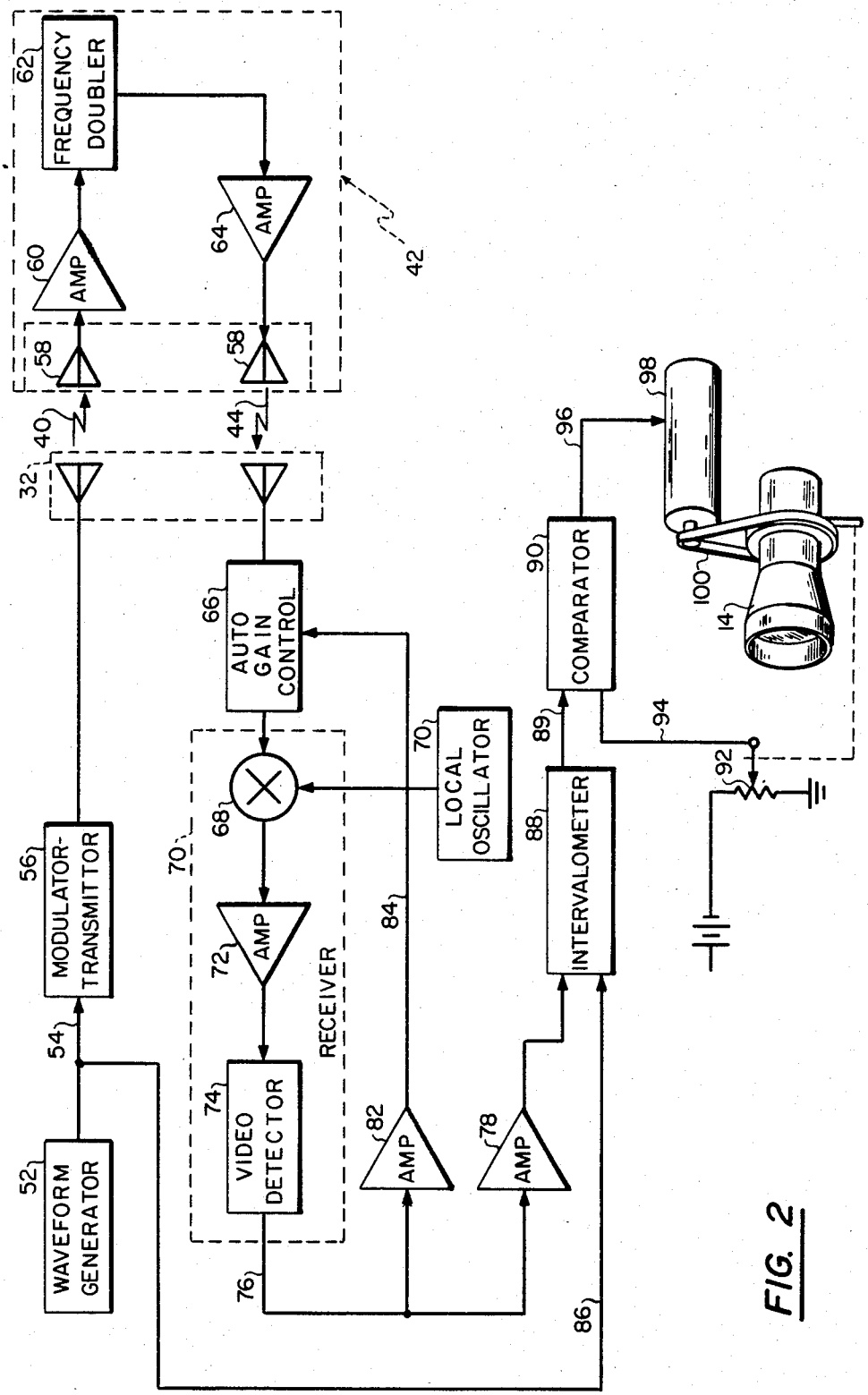
FIG. 2 is a schematic illustration of the basic circut of the present invention.

Turning to FIG. 2 of the drawings, a schematic diagram of the system is illustrated. The system includes means for generating a suitable signal such as a waveform generator 52 which preferably generates pulses on the order of about 10 nanoseconds in length at about 100 kilohertz repetition rate with the pulses transmitted by a conductor 54 to a modulator-transmitter which produces pulses of high frequency (e.g. microwave) radio energy whose duration and repetition rate is determined by the waveform generator 52. Pulses of such short duration are desirable because of the short distances of operations. This allows the transmission of a particular pulse to be completed before it is received back at the camera. In essence the signal must be at least as short as the minimum time delay for the round trip. It is noted that the radio waves travel at the speed of light.

A suitable range of frequency would be on the order of about 10.5 GHz to about 21 GHz. The frequency of about 10.5 GHz might be selected for such a system because it is infrequently used for terrestrial communication links, and accordingly, to facilitate FCC licensing. Also, the propagation distances of interest are of such short range that atmospheric absorption losses within this frequency band are not a problem. The modulator-transmitter transmits a signal pulse that is on the order of in a preferred range of about 10.5 GHz by way of an antenna 32 which is received by signal coding device 42 which is analogous to a transponder where the signal is then coded and retransmitted.

The signal coding device carried by the target or object 34 is a miniature electronic device analogous to a transponder and is on the order of the size of a pack of cigarettes or somewhat smaller. This device includes an antenna 58 which receives the signal and amplifies it through an amplifier 60 and codes it such as by doubling the frequency, for example. The signal is amplified and fed into a frequency doubler 62 which doubles the frequency to 21 GHz, feeds it through an amplifier 64 and retransmits it back through the antenna 58. Other forms of coding may be utilized.

The coded and retransmitted signal 48 is received at antenna 32 and fed through an attenuator for automatic gain control of the signal.

The signal is then processed in the receiver by first introducing into a mixer 68 for combining with a signal from a local oscillator 70 which signal is then amplified by an amplifier 72 and transmitted through a video detector 74. The signal is then carried by such as conductor 76 and amplified in an amplifier 78 before feeding into a intervalometer 88. A portion of the received signal is amplified in an amplifier 82 and, via line 84, is utilized as an automatic gain control signal for the PIN diode attenuator 66.

The intervalometer 88 measures the time difference between the signal from the receiver and a signal by way of conductor 86 from the transmitter for establishing a time of travel of the signal from the antenna 32 (camera lens) to the target and back to the receiver. The intervalometer generates a signal such as a proportional analog voltage that changes with the range from the lens to the target and transmits this signal by way of a conductor 89 to a comparator 90 which compares this signal to a signal that may be designated a lens focus signal from a potentiometer or other suitable signal or position determining means 92 by way of line 94 for generating a difference signal or a signal proportioned to the difference between the two signals. Any difference signal generates a focusing signal transmitted by way of conductor 96 to a focusing motor 98 which is coupled by gear drive mechanism 100 for driving the focusing ring of the lens 14. This system provides a continuous automatic monitoring and focusing of the lens system of the camera in response to movement of the selected target which carries the reactive signal generator 42.

The modulator transmitter having a 10 nanosecond pulse length with the capabilities of modulation within the 10.5 GHz range is within the state of the very recently developed art. Such modulator transmitters are currently within the state of the capabilities and may be obtained on special order from Varian Associates in San Mateo, Calif. The operating frequency of the transmitter should be in the range of microwave (10 GHz) to millimeterwave (16-35 GHz) spectrum and will be pulsed with pulse lengths on the order of 10 nanoseconds or less. Such short-pulsed high radio frequencies are required to permit a reasonable number of radio frequency cycles within the pulse in order to define a realistic radio frequency. Also, microwave or higher frequencies will permit the use of a physically small antenna which demonstrates significant gain and narrow beam width. The pulse repetition rate can be much higher than normal radar systems because of the short range. Such high repetition can compensate for short pulses in terms of average power which effects radar sensitivity. The components of the system will be constructed of solid state components.

The reactive signal coder 42 can be of a monolithic construction with a simple antenna such as a printed circuit type. This device will include an antenna, amplifier, frequency doubler and duplexer. It will receive the pulses, amplify them and double the radio frequency and re-radiate on the same antenna. The size would be on the order of such that it could be readily concealed in the outer clothing disguised as jewelry, or other items such as a belt buckle, a sheriff's badge, or the like. Such devices can be obtained on special order from Avantek, Inc. of Santa Clara, Calif.

A situation may exist where it is desirable to quickly focus on a secondary character, or to move quickly to multiple subjects as mentioned in FIG. 1. In such case, the camera can be provided with a signal generator capable of generating a slightly different signal, i.e. a different frequency signal from the first-mentioned signal which is within the tuning range to which a second reactive signal generator 46 is responsive for coding and returning that signal. The system must be able to receive and process this in the manner as above described for focusing the lens on the object wherein the second interactive coding transmitter exists. In such a situation, the camera operator is simply provided with a selector switch for selecting a selected one of the subjects. Any number of different subjects with its own distinctive frequency reactive signal generator may be handled in a similar fashion. The auto focusing control unit would have the capability of selectively transmitting and receiving at selected different radio frequencies, with transponders corresponding to the selected frequencies.

Referring to FIG. 3 of the drawing, a portion of the control system is illustrated with identical components identified by the identical reference numerals as in previous embodiments. In this embodiment the intervalometer is provided with means for measuring and storing the time interval between the transmitter pulse and each successive pulse received by the intervalometer. Transponder selection control means is then provided to select which of the successive pulses the intervalometer is to present to the comparator for adjustment of the lens. Each pulse will be received at a time interval representative of the distance traveled and thereby the distance of the subject from the camera lens. Thus, identical transponders may be utilized with selection control means available for selecting the closest, the intermediate or the farthest object as determined by the time intervals. This provides a more simplified system than previously described for a multiple subjects but requires a more precise control over the received signals. In this embodiment the camera operator need only be provided with a selector switch or control that activates the transponder selection control 102 of the system.

Turning to FIG. 4, a still further embodiment is illustrated wherein a plurality of transponders 104 and 106 are each provided with radio control links consisting of receivers 108 and 110 for receiving a signal for either activating or deactivating the respective transponder and remote transmitters 112 and 114 which are utilized for producing the control signals to which receivers 108 and 110 are timed. Thus, all of the transponders may operate on the same frequency with the camera man or his assistant having a transmitter capable of either activating or deactivating selective transponders carried by the particular subject to be filmed. Thereby selective activation or deactivation of the respective transponders operate to provide the necessary focusing signal for the camera to focus on the particular subject.

Other situations will exist wherein a multiple of cameras are being utilized for filming a scene in which there is only one subject of interest. In such situation, a system as illustrated in FIG. 5, is designed to accommodate multiple cameras. In this instance, a master synchronizer 116 may be provided between the various camera transmitters 118 and 120 to synchronize the transmission and receipt of the signals such that interference between the respective systems is avoided. Thus, a signal transmitted by one camera and coded and re-transmitted by a transponder 122 will not effect that signal transmitted by another camera.

Other alternatives include the ability to control specific signal reactive transmitters on the targets for disabling selective reactive transmitters and enabling others. Thus, by a separate control, certain interactive transmitters may be selectively activated and deactivated to selectively control the focus of the camera onto selected subjects.

Selector control means may be provided for selectively controlling the signal response of the intervalometer such that it reacts only to signals from a specified source or within a specified range.

While we have illustrated and described our invention by means of specific embodiments, it is to be understood that numerous changes and modification may be made therein without departing from the spirit and scope of the invention as defined in the appended claims.

We claim:

1. An automatic camera focusing system for a camera, said system comprising:
   an adjustable focus lens system having focusing means for adjusting the focus of said lens;
   first radio signal generating means carried by a camera to be focused for generating a first radio signal;
   second radio signal generating means carried by a photographic subject and responsive to said first radio signal for generating a second radio signal;
   means responsive to the time interval between transmittal of said first signal and receipt of said second signals for generating a focusing signal; and
   said focusing means responsive to said focusing signal for focusing said camera lens at a distance representative of said focusing signal.

2. The automatic camera focusing system of claim 1 wherein said signal generating means is a transponder.

3. The automatic focusing system of claim 1 wherein said radar is a pulse radar.

4. The automatic focusing system of claim 3 wherein said pulse is no more than 10 nanoseconds.

5. The automatic focusing system of claim 3 wherein the frequency of said first signal is in the range from 10 GHz to 35 GHz.

6. The automatic focusing system of claim 4 wherein said first signal is in the range of from 10 GHz to about 35 GHz.

7. The automatic focusing system of claim 5 wherein said second signal is twice the frequency of said first signal.

8. The automatic focusing system of claim 1 including a plurality of said second signal generating means, and discriminating means for discriminating between said plurality of second signal generating means.

9. The automatic focusing system of claim 8 wherein said discriminating means comprise means for selectively deactivating selected ones of said second signal generating means.

10. The automatic focusing system of claim 8 wherein said discriminating means includes means for selecting a second signal on the basis of the time interval of travel thereof.

11. An automatic camera focusing system for a camera, said system comprising:
    an adjustable focus lens system having focusing means for adjusting said lens;
    first radio signal generating and transmitting means carried by a camera to be focused for generating and transmitting a first radio signal toward a photographic subject;
    second radio signal generating and transmitting means carried by a photographic subject and responsive to said first radio signal for generating and transmitting a second radio signal distinct from said first signal;
    means responsive to the time interval between transmittal of said first signal and receipt of said second signal for generating a focusing signal; and
    said focusing means being responsive to said focusing signal for focusing said camera lens at a distance representative of said focusing signal.

12. The automatic camera focusing system of claim 11 wherein said second signal generating means is a transponder.

13. The automatic focusing system of claim 12 wherein said radar is a pulse radar.

14. The automatic focusing system of claim 13 wherein said pulse is no more than 10 nanoseconds.

15. The automatic focusing system of claim 11 wherein the frequency of said first signal is in the range from 10 GHz to 35 GHz.

16. The automatic focusing system of claim 13 wherein said first signal is in the range of from 10 GHz to about 35 GHz.

17. The automatic focusing system of claim 15 wherein said second signal is twice the frequency of said first signal.

18. The automatic focusing system of claim 13 including means for synchronizing two or more of said first signal generating means.

19. A focusing system for automatically focusing the lens of a camera comprising:
    focusing means responsive to a focusing signal for focusing the lens of a camera;
    first radio signal generating and transmitting means for generating and transmitting a first radio signal pulse of about ten nanoseconds having a frequency of about ten to about thirty-five GHz toward a photographic subject;
    second radio signal generating and transmitting means for positioning at a photographic subject and responsive to said first radio signal for generating and transmitting a second radio signal of about ten nanoseconds and at a different frequency within said frequency of about ten to about thirty-five GHz; and
    means responsive to the combined travel time of said first and second signals for generating a focusing signal for operating said focusing means.

20. A focusing system according to claim 19 comprising:
    a plurality of said second signal generating means; and
    discriminating means for discriminating between the signals of each of said plurality of second signal generating means.

* * * * *